United States Patent [19]
Grohsmeyer

[11] Patent Number: 4,935,871
[45] Date of Patent: Jun. 19, 1990

[54] ELECTRONIC ROAD SYSTEM GENERATION METHOD FOR AN AUTOMATIC GUIDED VEHICLE

[75] Inventor: Paul D. Grohsmeyer, Dunlap, Ill.

[73] Assignee: Caterpillar Inc., Peoria, Ill.

[21] Appl. No.: 314,511

[22] Filed: Feb. 23, 1989

[51] Int. Cl.⁵ .............................................. G06F 15/50
[52] U.S. Cl. .................................. 364/424.02; 180/168
[58] Field of Search ...................... 364/424.01, 424.02, 364/449; 180/167, 168, 169; 340/988, 989

[56] References Cited

U.S. PATENT DOCUMENTS

| | | | |
|---|---|---|---|
| 4,647,784 | 3/1987 | Stephens | 250/561 |
| 4,727,492 | 2/1988 | Reeve et al. | 364/424.04 |
| 4,733,356 | 3/1988 | Haeussermann et al. | 364/424.02 |
| 4,777,416 | 10/1988 | George, II et al. | 364/424.02 |
| 4,791,570 | 12/1988 | Sherman et al. | 180/168 |
| 4,817,000 | 3/1989 | Eberhardt | 364/424.02 |

FOREIGN PATENT DOCUMENTS 0297811  1/1989  European Pat. Off. ....... 364/424.02

Primary Examiner—Gary Chin
Attorney, Agent, or Firm—Wei Wei Jeang; Stephen L. Noe

[57] ABSTRACT

Automatic guided vehicle (AGV) road system generation and modification are fully integrated and incorporated as part of facility planning. The plant facility planning computer system and the AGV computer system mutually share navigation and plant layout information, as well as AGV road system and floor layout modifications. The facility planning computer is also capable of receiving AGV position information and displaying the vehicles graphically superimposed over the plant layout display, with near real time accuracy.

8 Claims, 1 Drawing Sheet

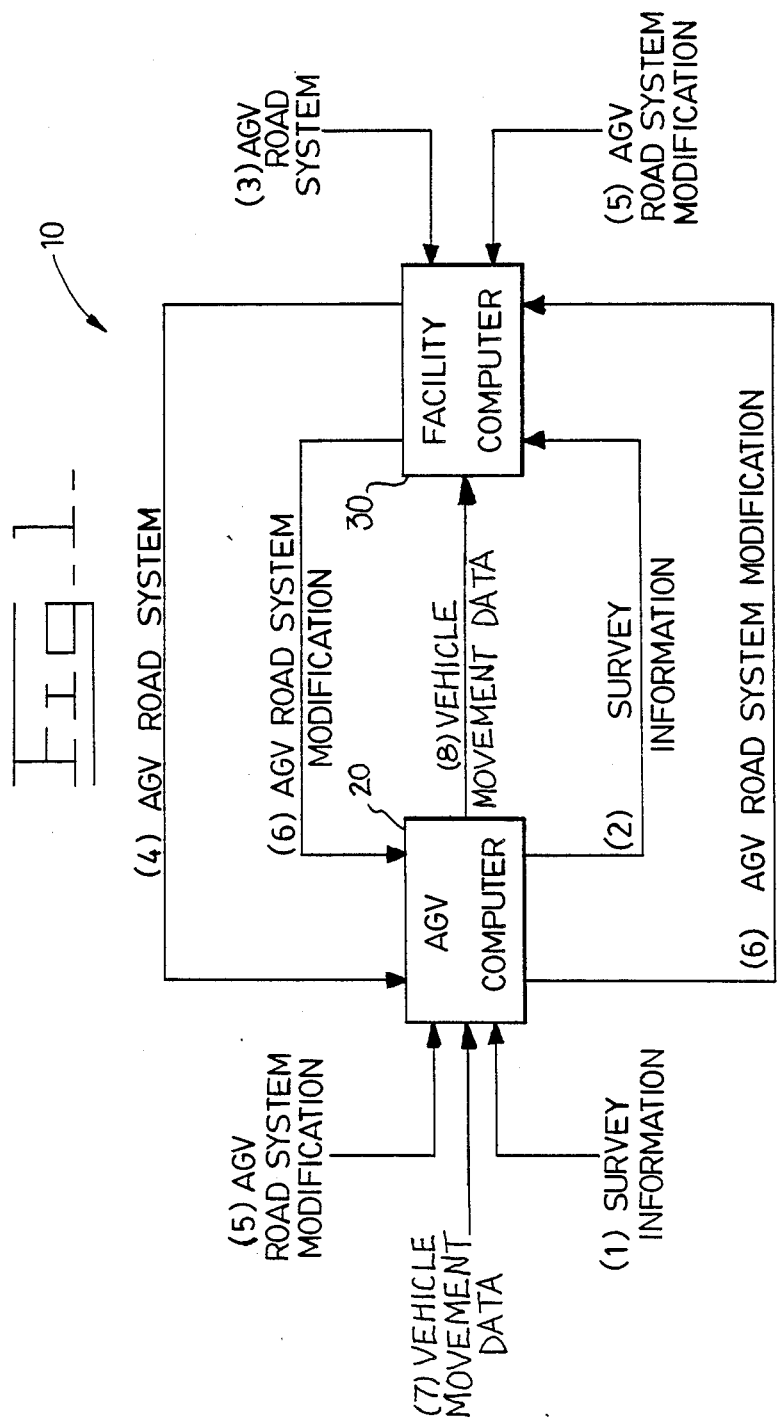

ELECTRONIC ROAD SYSTEM GENERATION METHOD FOR AN AUTOMATIC GUIDED VEHICLE

TECHNICAL FIELD

This invention relates generally to an automatic guided vehicle system and more particularly, to a method for electronically generating and updating the road system for automatic guided vehicle operations.

BACKGROUND ART

Various types of driverless material handling automatic guided vehicles (AGV) are in operation today. These AGVs generally navigate about a facility using some type of guidepath tracking or sighting unique landmarks such as bar code targets while under the control of an AGV system host computer. Typically, the host computer relays by radio to the AGV a dispatch command describing the job to be performed, such as picking up a load at point X, and depositing it at point Y. The host computer, having knowledge of facility layout, is able to dispatch jobs to the closest idle AGV that can most efficiently perform this job. The appointed AGV then follows the routing information given and completes the job.

The facility layout information that is essential to the AGV operations typically is obtained by a survey team. This same information is also used by the plant process planning group for material handling simulation and planning, and entered into a computer system dedicated to that task. Additionally, the same layout information is entered into the AGV system host computer. The present method incorporates the AGV system and the facility computer system, and as a result, eliminates information regeneration and some manual entry. This method also allows for facility layout information to be verified and corrected by an operating AGV, relaying it back to the AGV host computer, and updating the information in the manufacturing process planning computer. Further, any modifications in the layout of the facility may be changed in the AGV host computer or the manufacturing process planning computer and the new layout transferred and reflected in the other system.

DISCLOSURE OF THE INVENTION

The object of the invention is to fully integrate AGV path generation into manufacturing process planning.

In one aspect of the invention, a method for planning a road system for a material handling automatic guided vehicle (AGV) in a facility is disclosed. The AGV operates in designated areas within the facility, and is controlled by a first computer dedicated to AGV operations. This method comprises the steps of surveying the facility layout, and entering the facility layout information into the first computer. Then transferring electronically the facility layout to a second computer dedicated to manufacturing process planning. Next the AGV designated areas are entered graphically into the second computer and also transferred to the first computer.

In another aspect of the invention, the method subscribes steps for planning a road system for an automatic guided vehicle (AGV) in a contained area. The AGV navigates by sighting a plurality of unique landmarks and operates in designated areas within the contained area. The method comprises the steps of first surveying the unique landmarks in the contained area where the AGVs operate. Next the survey information is transferred to a first computer which is adapted to controlling AGV operations. Further, the AGV landmark locations are transferred to a second computer dedicated to manufacturing process control and planning. Then the designated areas are entered into the second computer, and later transferred to the first computer. A facility layout modification would include the additional steps of entering plant layout changes on the second computer, and transferring the changes to the first computer for plant layout update.

The invention also includes other features and advantages which will become apparent from a more detailed study of the drawings and specification.

BRIEF DESCRIPTION OF THE DRAWINGS

For a better understanding of the present invention, reference may be made to the accompanying drawings, in which:

FIG. 1 is a block diagram showing the sequence of steps and information transfer.

BEST MODE FOR CARRYING OUT THE INVENTION

FIG. 1 is a block diagram illustrating the information flow and the steps of a method 10. The method 10 involves operations performed on two computer systems, an AGV computer 20 and a facility computer 30. The AGV computer is a computer dedicated to the AGV fleet operations. It is responsible, for example, for dispatching jobs to the nearest available AGV, directing AGV traffic, and supplying the AGV with the surveyed target location. The facility computer 30 is used to produce factory floor layouts and monitor material flow and processing. The facility computer 30 is usually equipped with a graphics screen for graphical representations of the factory floor layout. Preferably, the facility computer 30 is also equipped with a pointing instrument such as a light pen or a mouse for entering points and lines into the computer.

Referring to labeled information paths represented by arrows in FIG. 1, survey information is entered into the AGV computer via path (1). The survey information contains the locations of AGV targets, which is usually recorded by using a theodolite. The raw survey information which is entered into the AGV computer 20 is in the form B-A-# $\alpha$ d, where B and A are set points of which the coordinates are known; # is the location code of the target; $\alpha$ is the angle formed between B-A and the target in degrees, minutes, seconds; and d is the distance between the target and set point A. It can be appreciated that the representation of the survey information may take on other forms, but the numerical information must be present. This survey information is then translated into absolute coordinates by an AGV computer software, having the numerical format common to both the AGV computer 20 and the facility computer 30. As illustrated by path arrow (2), this translated survey information is transferred electronically to the facility computer 30. Due to the differences in data representation between computers, a translation step may be required for this information transfer in order for the information to be usable to the second computer 30.

Presently, referring to path arrow (3), the AGV road system is entered into the facility computer 30. The AGV road system consists of specially designated areas where the AGV may operate under certain preset conditions. An AGV path is a set of designated areas the AGV traverses to get from one point to another (e.g. from a loading point to an unloading point). There may be multiple paths between two points. In the instant embodiment, a designated area can be a zone, aisle or docking point. A zone is an area where only one AGV may enter and operate at a time, i.e. when an AGV is operating in a zone, no other AGVs may enter the same zone. An aisle is an area that has directional and width specification, i.e. a two way aisle of two AGV width, an one way aisle of one AGV width, and a two way aisle of one AGV width. Finally, a docking point is a parking spot or where loads may be picked up and deposited. Preferably, because of the graphics capability of the facility computer 30, these designated areas, and therefore the AGV paths and the road system, are directly drawn on the computer screen or pad by the light pen or mouse, and the areas entered are immediately reflected on the screen along with the factory layout. Additionally, there is also capability on the AGV computer to accept the AGV road system, but this requires the more tedious entry of the coordinates and other information. This latter road system entry path is not shown in FIG. 1.

Path arrow (4) illustrates the transfer of the road system information from the facility computer 30 to the AGV computer 20. Again, this may require another translation step (not shown) to change the data representation to conform to the AGV computer 20. After step (4), the AGV system is ready to operate, having all the navigation information it needs to direct the AGV fleet. On initialization, the road system and the target locations are relayed to the AGV fleet via a communication link, preferably by radio, where the information is stored in battery supported RAM (random access memory).

In the preferred embodiment, the AGVs' drive system (not shown) monitor and measure the distance and steering angle traveled to determine present location in addition to sighting targets. This sufficiently accurate measurement information is periodically relayed back to the AGV computer 20 to update the factory floor layout and road system dimensions. This is indicated by path arrow (5). Further, manual entry of the road system modifications including target locations is also permitted on the AGV computer 20, as well as the facility computer 30, also shown by path arrows (5). Finally, any modification is reflected in the other computer by transferring electronically the updated information as indicated by path arrows (6). Along with the measurement information that is relayed back to the AGV computer 20 from the vehicles is the vehicle movement or present location information, indicated by path arrow (7). This information is then transferred to the facility computer 30, shown by arrow (8). Graphic representations of the AGVs are shown superimposed on the floor layout on the graphics monitor display, showing the exact locations of the AGVs as they operate on the factory floor. This ability is invaluable in the monitoring and controlling of the AGV fleet. Again, data representation translation may be needed to perform these data transfer steps.

INDUSTRIAL APPLICABILITY

The method 10 finds application in the field of automatic guided vehicles (AGV).

Typically, an AGV system is a separate system from the factory facility computer system for many advantageous reasons. Furthermore, the AGV system is often an afterthought addition to the material handling system of the facility, and thus not integrated into the facility systems. However, because of the intimate relationship between the two systems, it is necessary for easy information transfer between them. Specifically, factory layout and measurement information related to the AGV system, such as bar code target location and designated AGV operating areas. Previously, the AGV road system is tediously entered into the AGV computer by numerically entering the coordinates and dimensions taken from a hard copy of factory layout produced by the facility computer. This same road system is also manually entered into the facility computer. Additionally, any modification is entered through the AGV computer, and also manually updated in the facility computer. The present invention allows information transfer bidirectionally between the AGV computer and the facility computer, thus fully integrating the AGV system into the facility computer system.

Other aspects, objects, and advantages of this invention can be obtained from a study of the drawing, the disclosure, and the appended claims.

I claim:

1. A method for planning a path for an automatic guided vehicle (AGV) in a facility, said AGV operates in designated areas within said facility, operation of said AGV being controlled by a first computer according to a road system, said method comprising the steps of:
   surveying the facility layout;
   entering said facility layout into said first computer dedicated to AGV operations;
   transferring electronically said facility layout to a second computer dedicated to manufacturing process planning;
   entering said AGV path graphically into said second computer based on said facility layout; and
   transferring said AGV path to said first computer.

2. A method for planning a road system in a facility for an automatic guided vehicle (AGV), said AGV operates in a contained area within said facility having a plurality of unique targets, said road system being within said contained area and being defined by designated areas, said AGV navigates by sighting said plurality of unique targets and a first computer is dedicated to controllably operate said AGV in said designated areas, said method comprising:
   surveying the locations of said plurality of unique targets in said contained area;
   entering said surveyed locations into said first computer;
   transferring said surveyed locations to a second computer, said second computer being dedicated to manufacturing process control;
   entering said road system graphically into said second computer based on said surveyed locations; and
   transferring electronically said road system to said first computer.

3. A method, as set forth in claim 2, wherein said AGV designated areas include first, second, and third areas wherein said first area is defined as an area where only one vehicle is allowed to operate, said second area is an area having directional and width designations, and said third area is designated for parking, material pick up and deposit.

4. A method, as set forth in claim 2, further comprising said operating AGV detecting actual contained area dimensions and the position of said operating AGV, relaying back said actual contained area dimensions and position to said first computer, and transferring said actual contained area dimensions and said position to said second computer for update.

5. A method, as set forth in claim 4, wherein said second computer includes a graphics monitor, said graphics monitor displaying said AGV position superimposed on facility layout, and updating said monitor periodically.

6. A method, as set forth in claim 2, including the steps of: entering modifications to the contained area and to the target locations on said second computer, and transferring said modifications to said first computer for update.

7. A method, as set forth in claim 2, including the steps of: entering modifications to the contained area and to the target locations on said first computer, and transferring said modifications to said second computer for update.

8. A method, as set forth in claim 2, wherein said transferring steps include translating said target locations and said designated areas into the data representations used by the respective first and second computers.

* * * * *